(12) United States Patent
Jones

(10) Patent No.: US 12,114,645 B1
(45) Date of Patent: Oct. 15, 2024

(54) FEEDER

(71) Applicant: Vontrice D. Jones, Geneseo, IL (US)

(72) Inventor: Vontrice D. Jones, Geneseo, IL (US)

(73) Assignee: Saltwater Solutions LLC, Geneseo, IL (US)

(*) Notice: Subject to any disclaimer, the term of this patent is extended or adjusted under 35 U.S.C. 154(b) by 17 days.

(21) Appl. No.: 17/666,221

(22) Filed: Feb. 7, 2022

Related U.S. Application Data

(60) Provisional application No. 63/146,298, filed on Feb. 5, 2021.

(51) Int. Cl.
*A01K 61/85* (2017.01)

(52) U.S. Cl.
CPC ................... *A01K 61/85* (2017.01)

(58) Field of Classification Search
CPC ........ A01K 61/85; A01K 97/02; A01K 61/80; A01K 1/0356; A01K 39/01; A01K 5/0121
USPC ...................................................... 119/51.04
See application file for complete search history.

(56) References Cited

U.S. PATENT DOCUMENTS

| | | | |
|---|---|---|---|
| 3,499,526 A | 3/1970 | Willinger | |
| 3,742,912 A | 7/1973 | Chen et al. | |
| 3,848,570 A * | 11/1974 | Scigliano | A01K 39/0106 119/51.03 |
| 4,638,588 A * | 1/1987 | Abadie | A01K 61/80 43/103 |
| 5,054,230 A * | 10/1991 | Woodman | A01K 97/02 43/44.99 |
| 5,676,091 A * | 10/1997 | Pennington | A01K 39/0106 119/477 |
| 5,778,824 A | 7/1998 | Musgrave et al. | |
| 6,338,419 B1 * | 1/2002 | Penney | A47G 7/06 220/475 |
| 9,282,842 B1 * | 3/2016 | Brooks | A47G 23/0225 |
| 9,351,480 B2 | 5/2016 | Tuan et al. | |
| 9,462,917 B2 * | 10/2016 | Licari | A47K 5/12 |
| 10,405,525 B2 | 9/2019 | Mm | |
| 2009/0250011 A1 | 10/2009 | Biggs | |
| 2011/0056437 A1 * | 3/2011 | Sprung | A01K 63/006 119/51.04 |
| 2013/0061810 A1 * | 3/2013 | Van Dyk | A01K 39/0106 119/61.31 |
| 2015/0366171 A1 * | 12/2015 | Tan | G01F 11/24 119/51.04 |
| 2016/0219841 A1 | 8/2016 | Yim | |

(Continued)

OTHER PUBLICATIONS

Orthodox_Reef—Instagram. Mar. 13, 2020 [online], [retrieved on Aug. 16, 2023]. Retrived from the Internet <URL: https://www.instagram.com/p/B9sNEzypU0s/?img_index=1> (Year: 2020).*

(Continued)

*Primary Examiner* — Brady W Frazier
*Assistant Examiner* — Zoe Tam Tran
(74) *Attorney, Agent, or Firm* — Hamilton IP Law, PC.; Jay R. Hamilton

(57) ABSTRACT

In an illustrative embodiment, a feeder may be comprised of a body, a lid, and a cover. A food sheet may be engaged with an exterior portion of the body and a cover may be positioned over the food sheet, such that the food sheet is positioned between the body and the cover. A lid may be engaged with a terminal end of the body to secure the relative position of the cover with respect to the body.

21 Claims, 16 Drawing Sheets

(56) References Cited

U.S. PATENT DOCUMENTS

2018/0000052 A1* 1/2018 Donegan ................. B65B 1/04
2023/0180731 A1* 6/2023 Bendure ............... A01K 97/04
                                                                                                   43/55

OTHER PUBLICATIONS

Description and Pictures from the Facebook page of "Ask BRS", Mar. 2020.

* cited by examiner

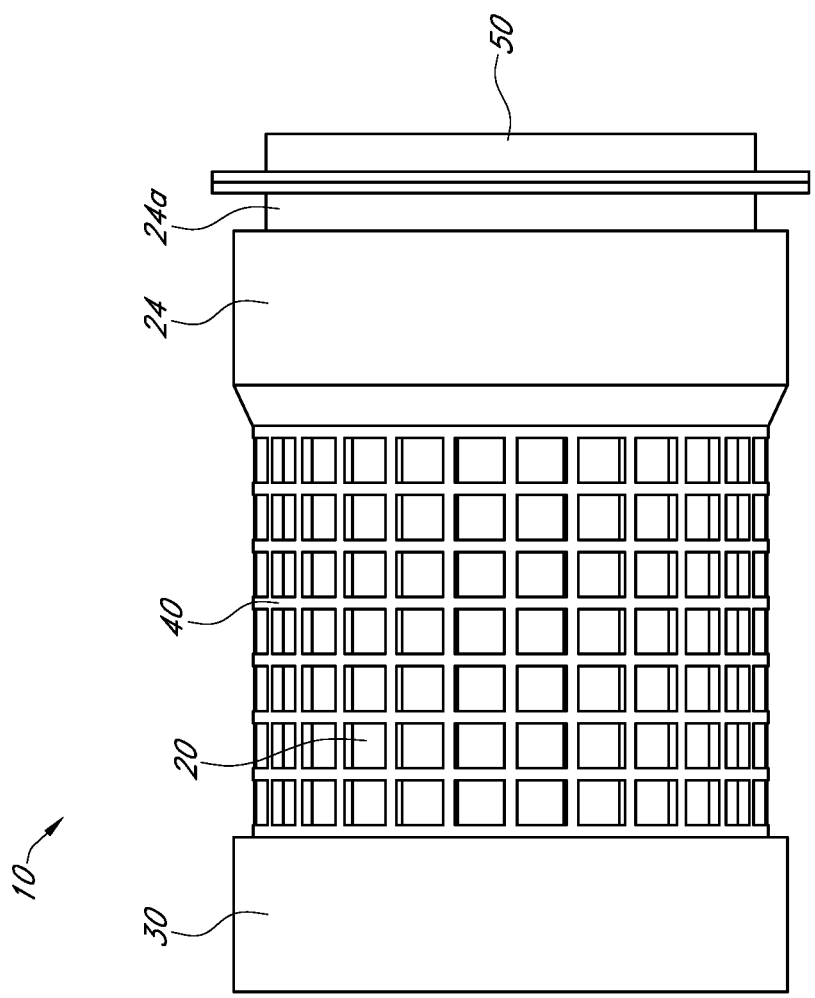

FEEDER

CROSS REFERENCE TO RELATED APPLICATIONS

This non-provisional utility application claims priority from provisional U.S. Pat. App. No. 63/146,298 filed on Feb. 5, 2021, which application is included by reference herein in its entirety.

FIELD OF THE INVENTION

The present disclosure relates to a device for feeding marine animals, and more specifically a feeder for use with a home aquarium.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Various feeding devices for marine life exist. However, such devices have various disadvantages in certain applications. One such disadvantage includes, without limitation unless otherwise indicated herein, the inability to prevent contamination of the area surrounding the feeder with various debris and/or unconsumed material.

BRIEF DESCRIPTION OF FIGURES

The accompanying drawings, which are incorporated in and constitute a part of this specification, illustrate embodiments and together with the description, serve to explain the principles of the methods and systems.

FIGS. 3A & B are perspective views of the illustrative embodiment of the feeder with the various components assembled, wherein FIG. 3A shows the feeder without a food sheet but engaged with a connector and FIG. 3B shows the feeder engaged with a food sheet but not a connector.

Figure 1A:
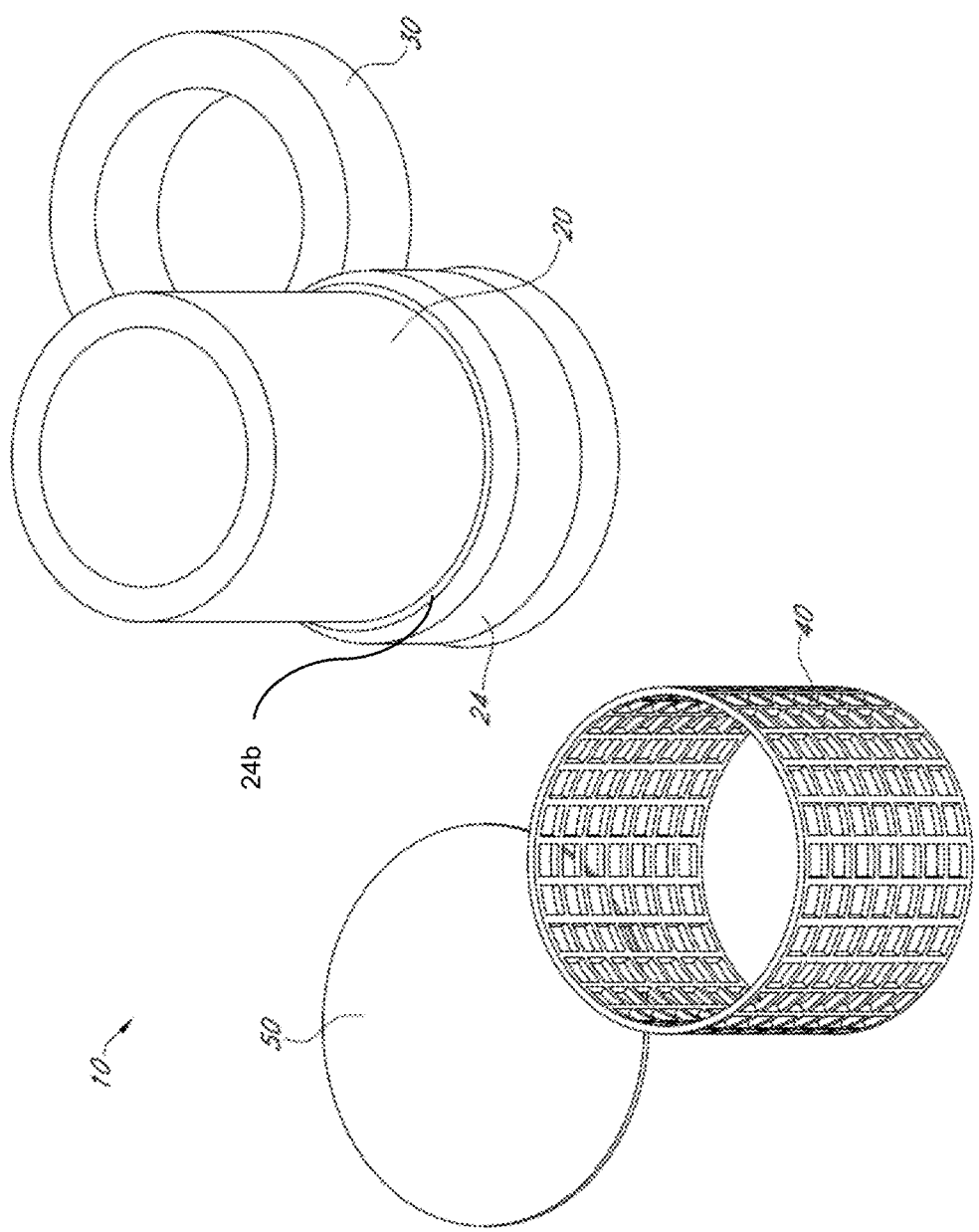
FIGS. 1A & B are perspective views of an illustrative embodiment of the feeder with the various components disassembled.

| DETAILED DESCRIPTION-LISTING OF THE ELEMENTS | |
|---|---|
| Element Description | Element Number |
| Feeder | 10 |
| Food sheet | 12 |
| Wall | 14 |
| Food sheet | 16 |
| Body | 20 |
| Gap | 22 |
| Base | 24 |
| Suction cup | 24a |
| Base ledge | 24b |
| Lid | 30 |
| Cover | 40 |
| Connector | 50 |

DETAILED DESCRIPTION OF INVENTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed herein are various components that may be used to perform the disclosed methods and provide the disclosed systems. These in addition to other components that may be compatible with the disclosed methods and systems, and it is understood that when combinations, subsets, interactions, groups, etc. of these components are disclosed, that while specific reference of each various individual and collective combinations and permutation of these may not be explicitly disclosed, each is specifically contemplated and described herein, for all methods and systems of the present disclosure. This applies to all aspects of this disclosure including, but not limited to, steps in disclosed methods. Thus, if there are a variety of additional steps that may be performed, it is understood that each of these additional steps may be performed with any specific aspects or combination of aspects of the disclosed methods.

The present methods and systems may be understood more readily by reference to the following detailed description of systems and methods (including the various aspects thereof) and the examples included therein and to the Figures and their following description. Further, although some figures included herewith show various dimensions of some features of certain illustrative aspects of certain components of the present disclosure, such dimensions are for illustrative purposes only and in no way limit the scope of the present disclosure unless so indicated in the following claims.

The following detailed description is of the best currently contemplated modes of carrying out the present methods and systems. The description is not to be taken in a limiting sense, but is made merely for the purpose of illustrating the general principles of the various aspects of the present disclosure, since the scope of the invention is best defined by the appending claims. Various inventive features are described below herein that can each be used independently of one another or in combination with other features without limitation unless so indicated in the following claims.

Figure 1B:
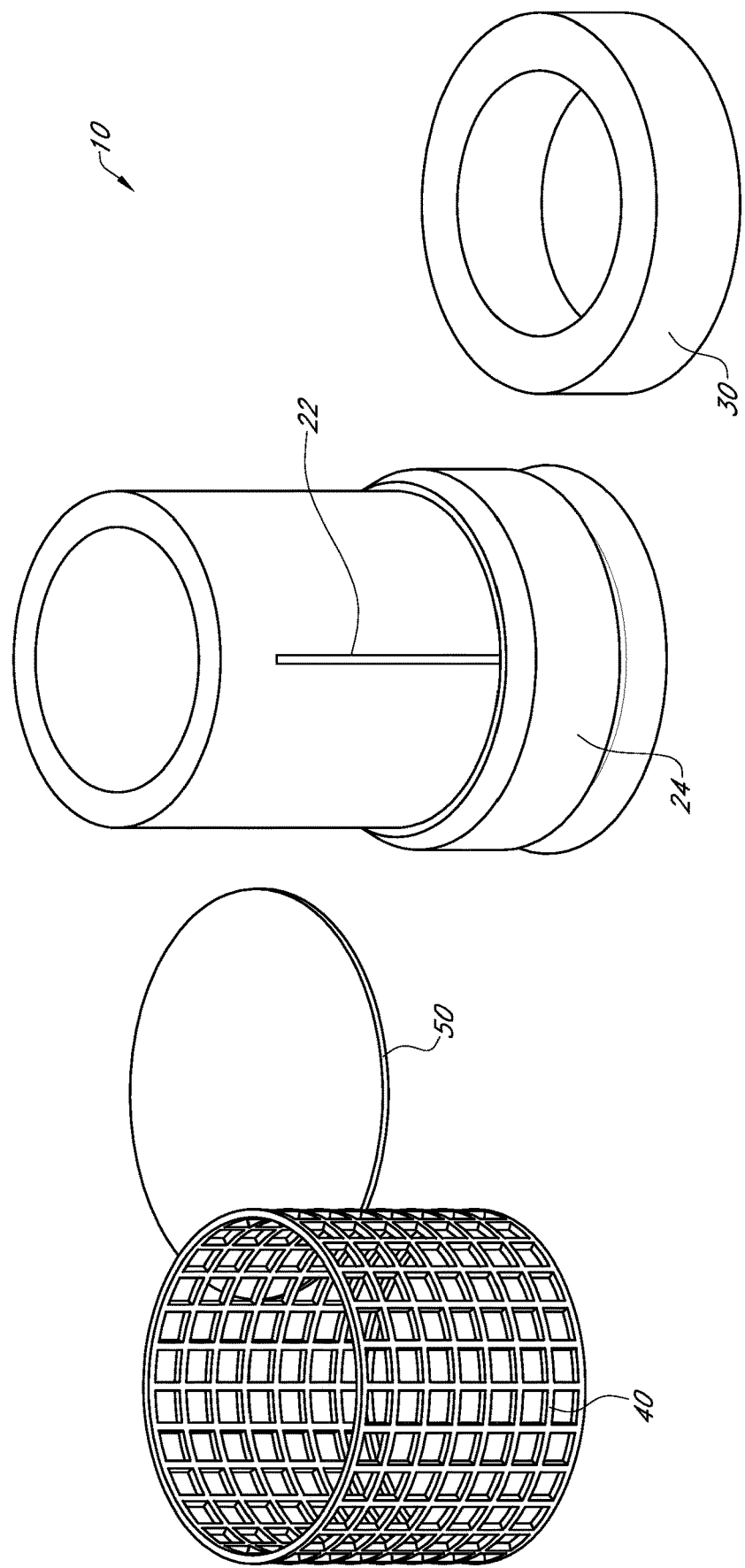
Figure 2:
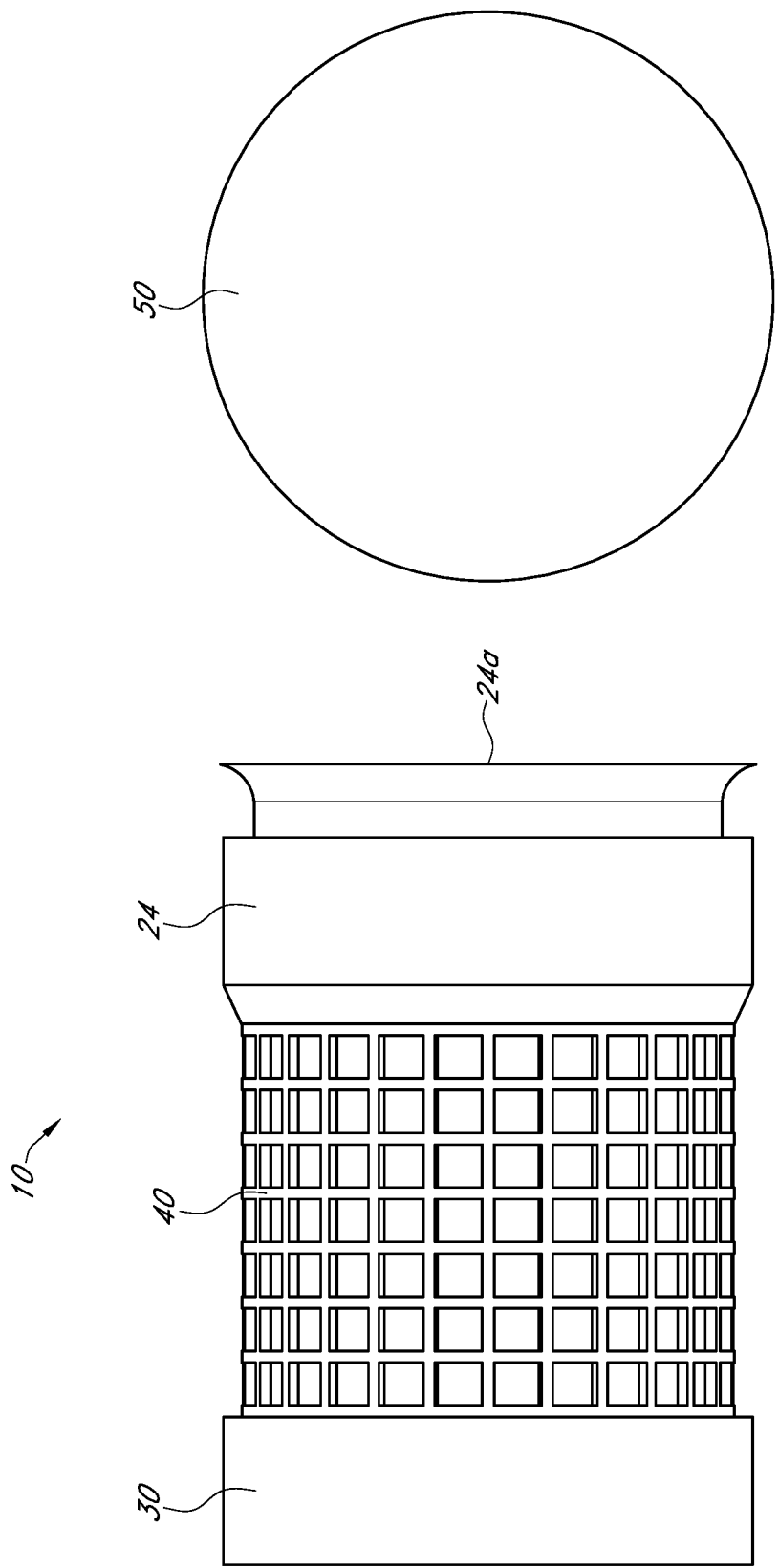
FIG. 2 is a perspective view of the illustrative embodiment of the feeder assembled and disengaged with the connector.
Figure 3B:
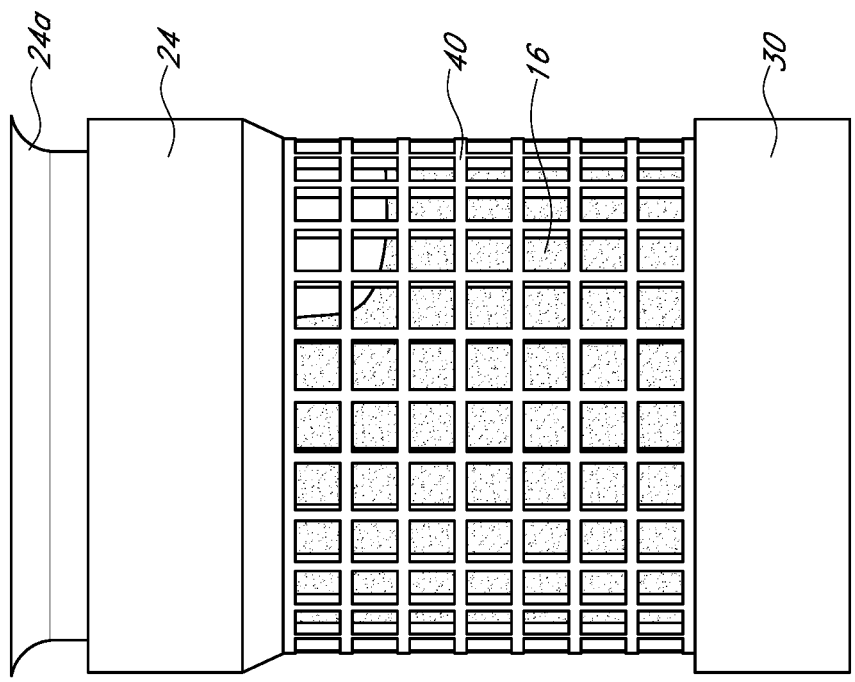

Referring generally to FIGS. 1A & 1B, a first illustrative embodiment of a feeder 10 is shown therein, wherein various components of the feeder 10 have been disassembled for purposes of clarity. Generally, the illustrative embodiment of a feeder 10 shown herein may be configured for use in an aquarium (not shown) and may be beneficial for providing various food sheets 16 to marine life inside the aquarium. It is contemplated that for certain applications the feeder 10 may be especially advantageous for use with a food sheet 16 comprised of nori, which generally may be available in various dimensions, but the scope of the present disclosure is not so limited unless otherwise indicated in the following claims. It is further contemplated that at least one advantage of the illustrative embodiments of a feeder 10 disclosed herein over the prior art is the mitigation and/or elimination of unwanted food particles within the aquarium without limitation unless otherwise indicated in the following claims.

In one embodiment a food sheet 16 comprised of nori may be configured as a 4-inch-by-7.5-inch rectangle, and a food sheet 16 so configured may be cut, folded, and/or otherwise manipulated to achieve the desired dimensions depending on the specific configuration of the feeder 10 as described in further detail below. It is contemplated that the food sheet 16 may be configured with a nominal thickness such that it is generally planar in shape. However, the scope of the present disclosure is not so limited and may apply to any number of configurations and/or compositions of a food sheet 16 unless otherwise indicated in the following claims.

Generally, the illustrative embodiment of a feeder 10 pictured herein may be comprised of a body 20 having a cover 40 positioned over a portion of the body 20. Both the body 20 and the cover 40 may be generally cylindrical in shape, wherein the inner diameter of the cover 40 may be slightly greater than the outer diameter of the body 20, such that the cover 40 may be selectively positioned over a portion of the body 20 during use as described in further detail below. Further, the cover 40 may be configured as a type of mesh or net having various apertures therein such that various portions of a food sheet 16 positioned between the body 20 and cover 40 may be available to marine life as further described in detail below. In one illustrative embodiment, the cover 40 may be configured as a mesh having generally square-shaped openings with a side length of approximately ¼ inch without limitation unless otherwise indicated in the following claims.

The body 20 may be formed with a base 24 and base ledge 24b at one end thereof, wherein the opposite end of the body 20 may be configured to selectively engage a lid 30. The cover 40 may be positioned to abut base ledge 24b between the base 24 and the lid 30 when the feeder 10 is assembled, as shown at least in FIGS. 1A, 2-4B. A first terminal end of the cover 40 may be positioned adjacent the base 24 and a second terminal end of the cover 40 may be positioned adjacent the lid 30, such that the body 20, lid 30, and cover 40 may be generally concentric without limitation unless otherwise indicated in the following claims.

In an illustrative embodiment, the axial length of the cover 40 may be less than that of the body 20 such that when the cover 40 is positioned over the body 20 and a first end of the cover 40 abuts the base ledge 24b of base 24, the opposite end of the body 20 extends axially beyond the opposite end of the cover 40, thereby providing an area of the body 20 for engagement of a lid 30 as further described below. However, other configurations, dimensions, etc. of the body 20, cover 40, and/or lid 30 may be used without limitation unless otherwise indicated in the following claims.

Figure 5:
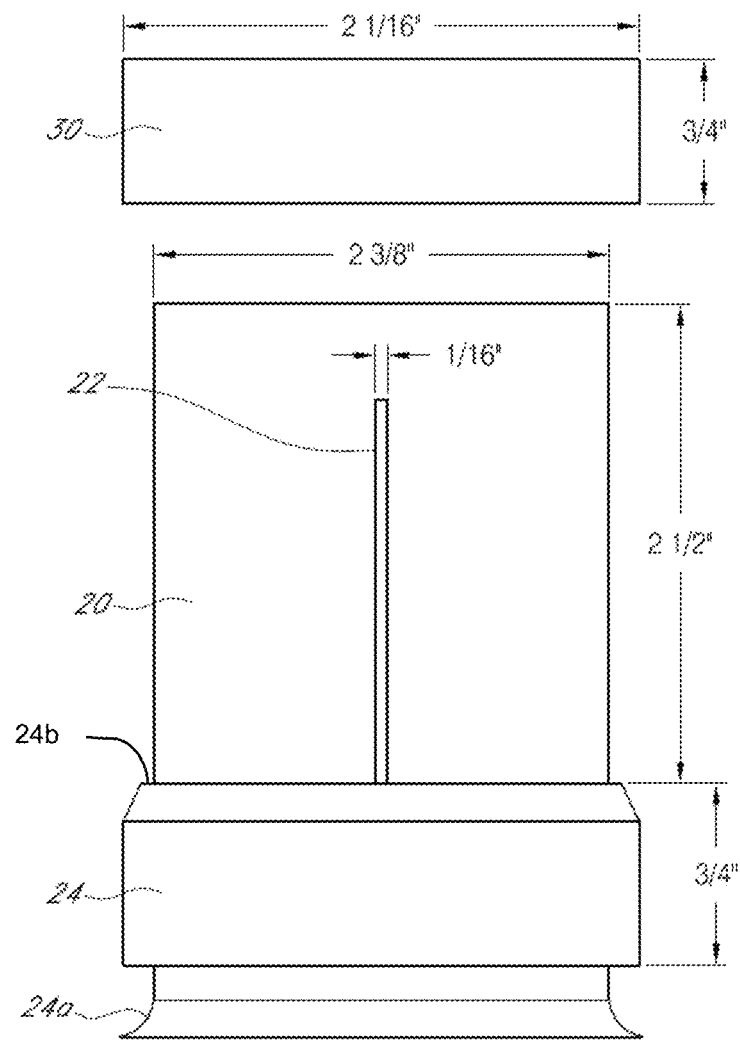
FIG. 5 is a detailed drawing showing various illustrative dimensions for various components of the illustrative embodiment of a feeder.
Figure 6:
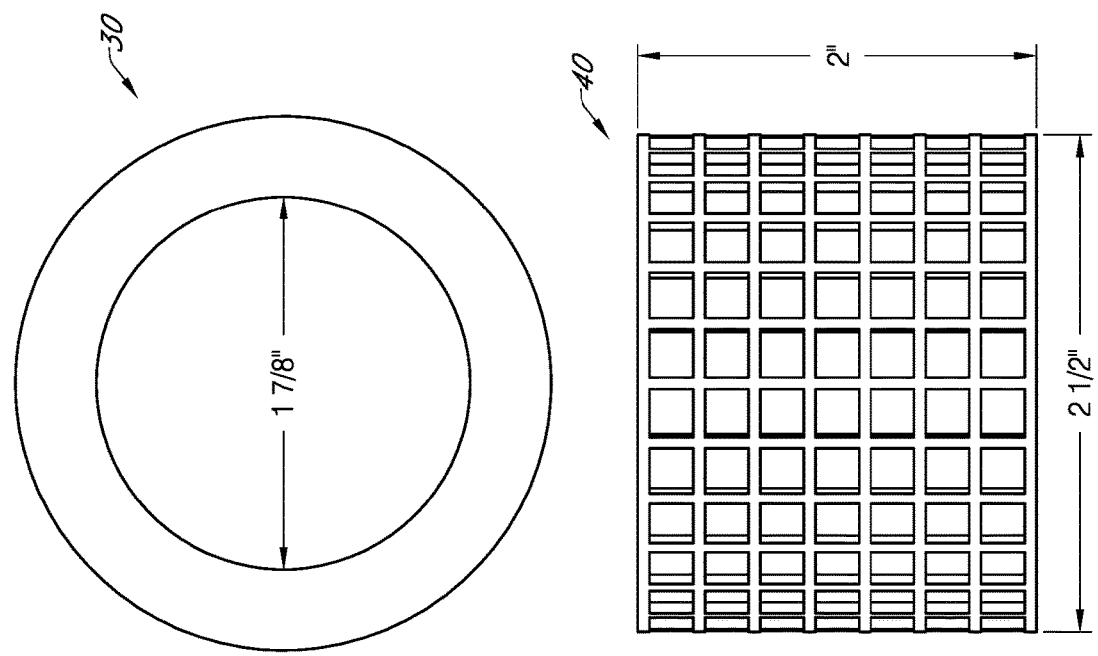
FIG. 6 is another detailed drawing showing various illustrative dimensions for various components of the illustrative embodiment of a feeder.
Figure 7:
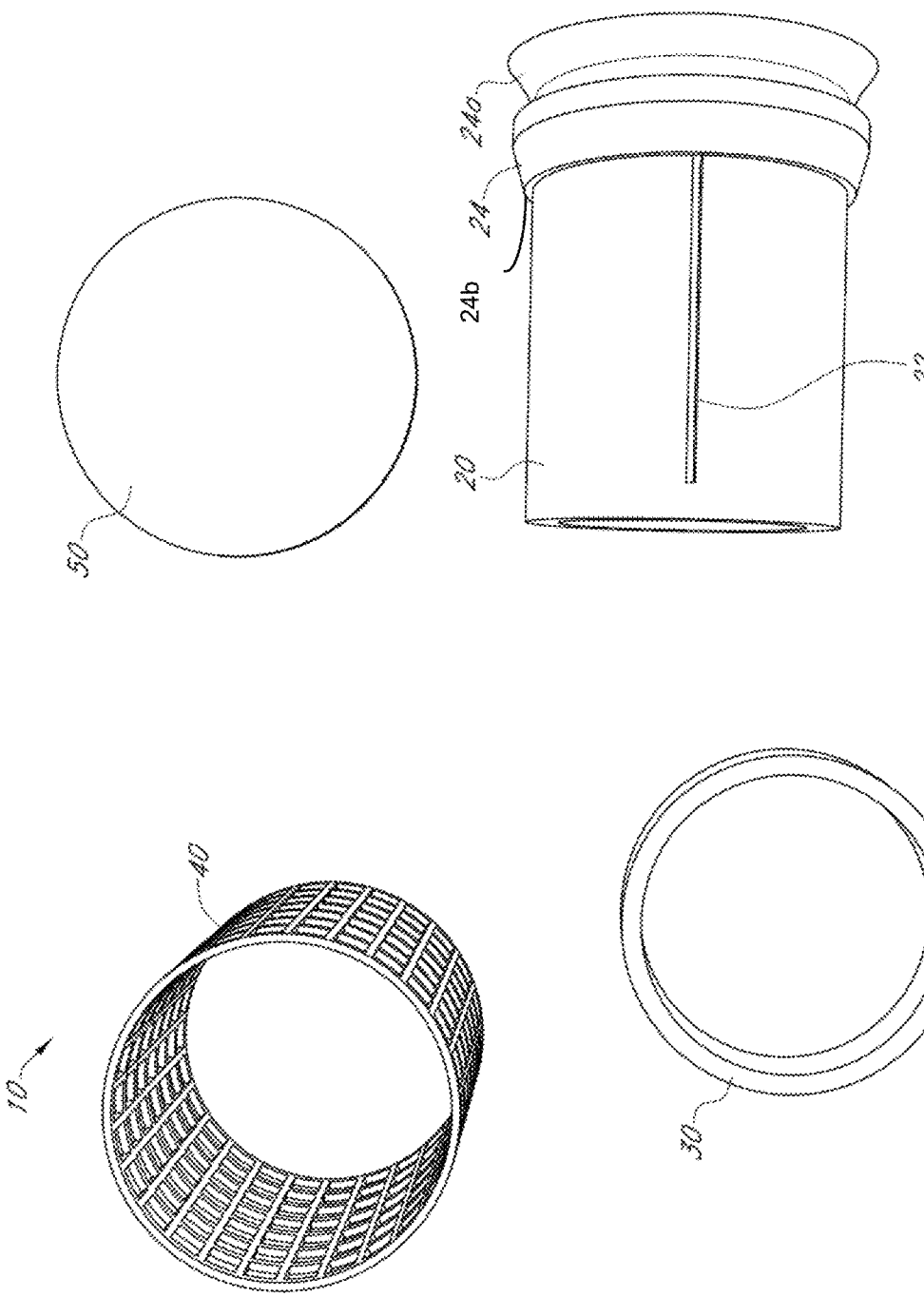
FIG. 7 is a perspective view of another illustrative embodiment of the feeder with the various components disassembled.
Figure 8:
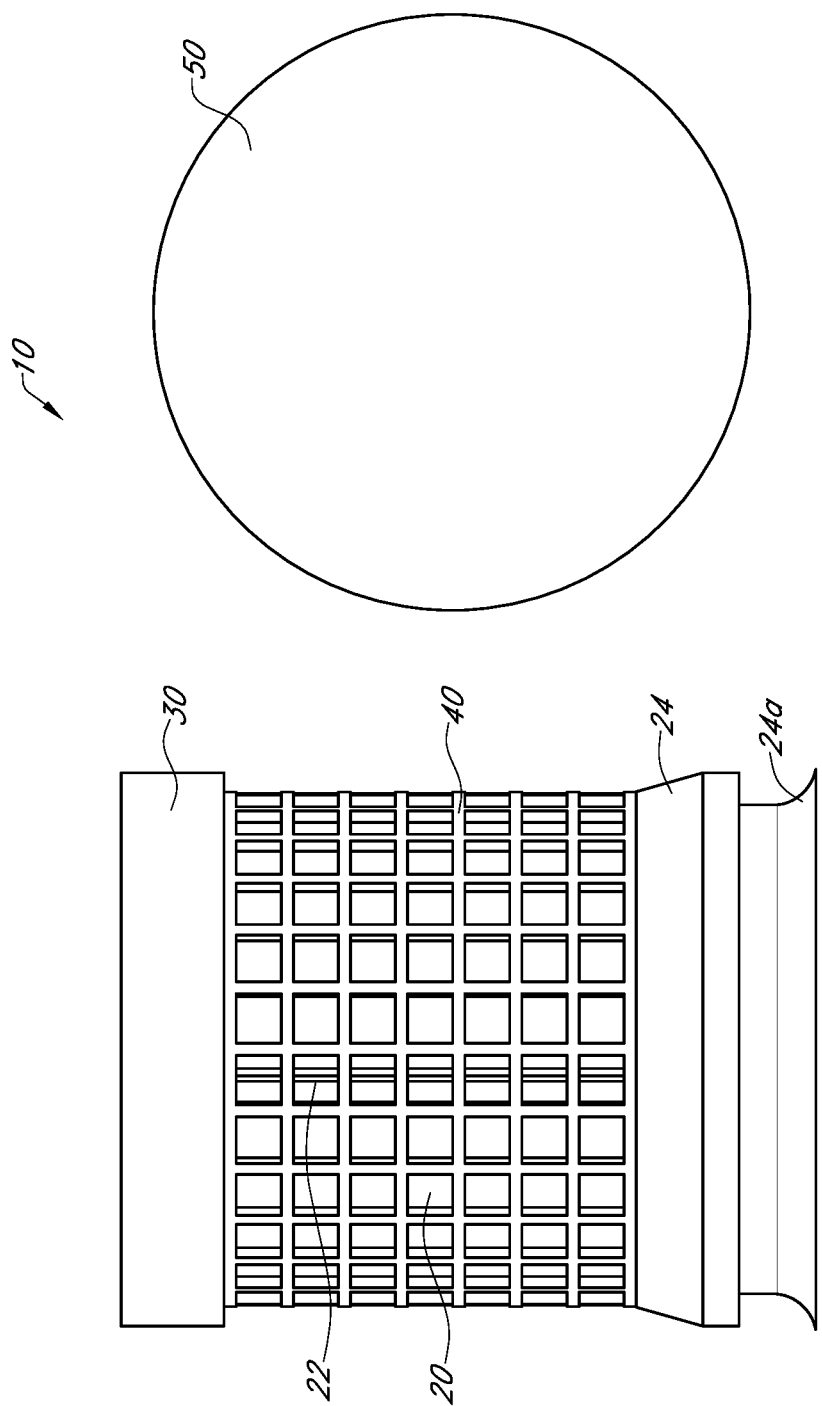
FIG. 8 is a perspective view of the illustrative embodiment of the feeder shown in FIG. 7 assembled and disengaged with the connector.
Figure 9A:
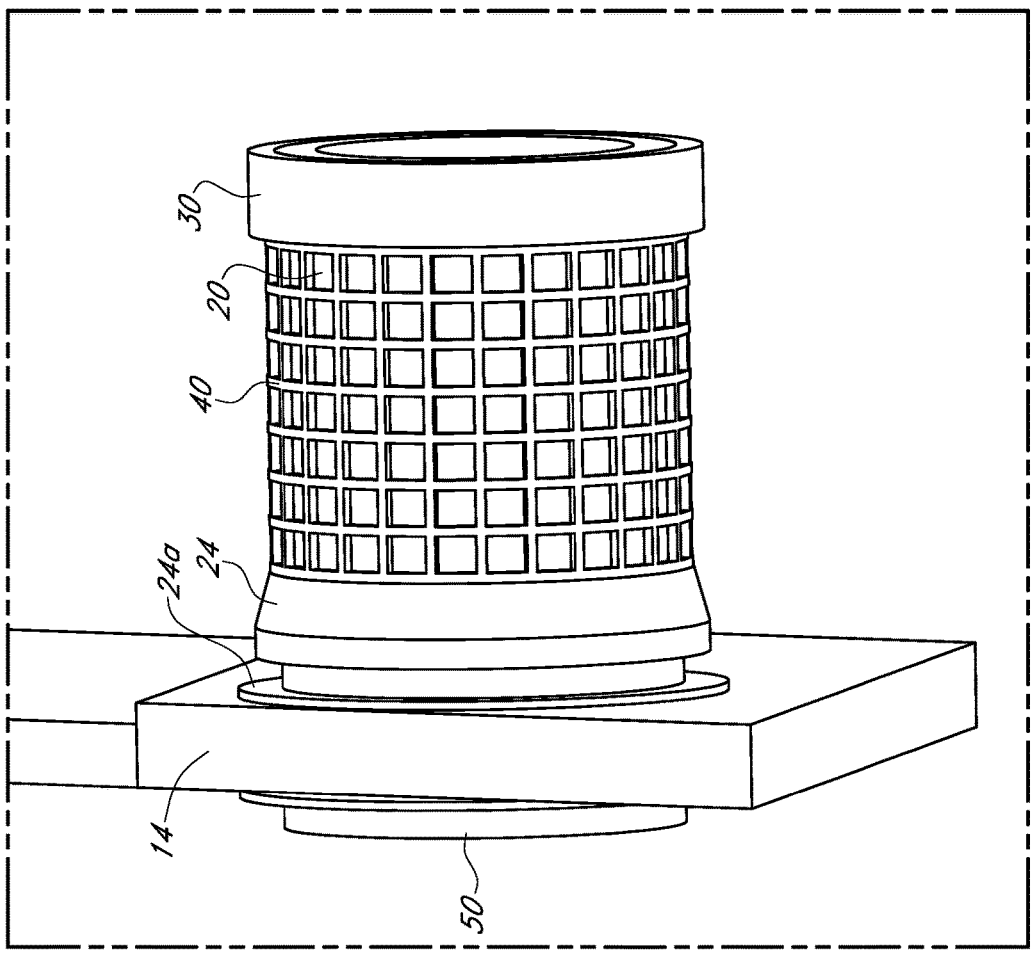
FIGS. 9A & B are perspective views of the illustrative embodiment of the feeder shown in FIGS. 7 & 8 with the various components assembled and the feeder mounted to a wall via engagement with the connector and suction cup.
Figure 9B:
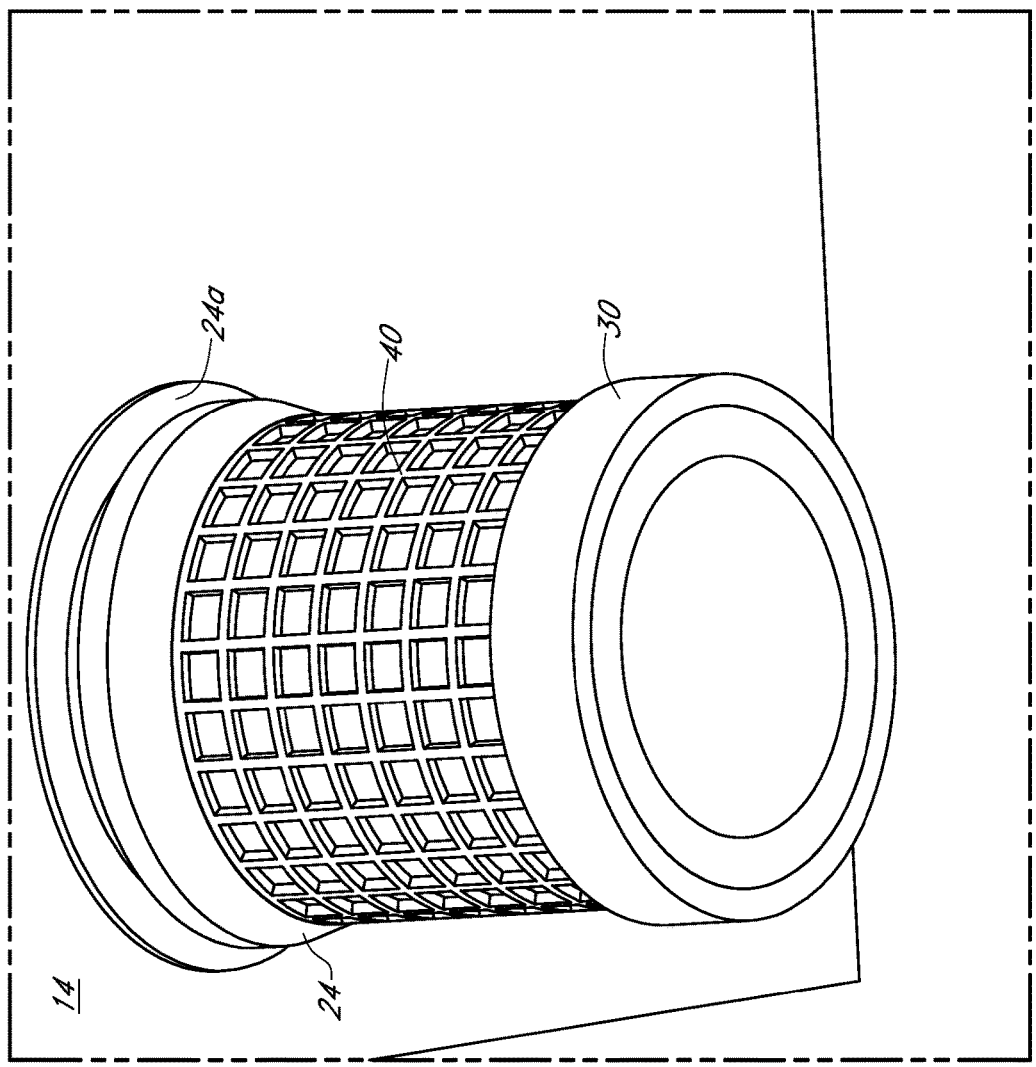

As shown at least in FIG. 5, the body 20 may be configured with a gap 22 therein along the longitudinal axis (i.e., axial length) of the body 20. It is contemplated that during use, a first edge of a food sheet 16 may be positioned within the gap 22 to retain the food sheet 16 and secure the relative position thereof with respect to the body 20 as described in further detail below. Although various dimensions for certain components of an illustrative embodiment of a feeder 10 are shown in FIGS. 5 & 6, such dimensions are not meant to be limiting to the scope of the feeder 10 or method of using same but are merely for illustrative purposes unless otherwise indicated in the following claims. It is contemplated that the optimal configuration, dimensions, etc. of the various components of the feeder 10 may vary from one application to the next and may be dependent at least upon the specific marine life within an aquarium and/or the specific configuration of the food sheet 16 without limitation unless otherwise indicated in the following claims.

Figure 4A:
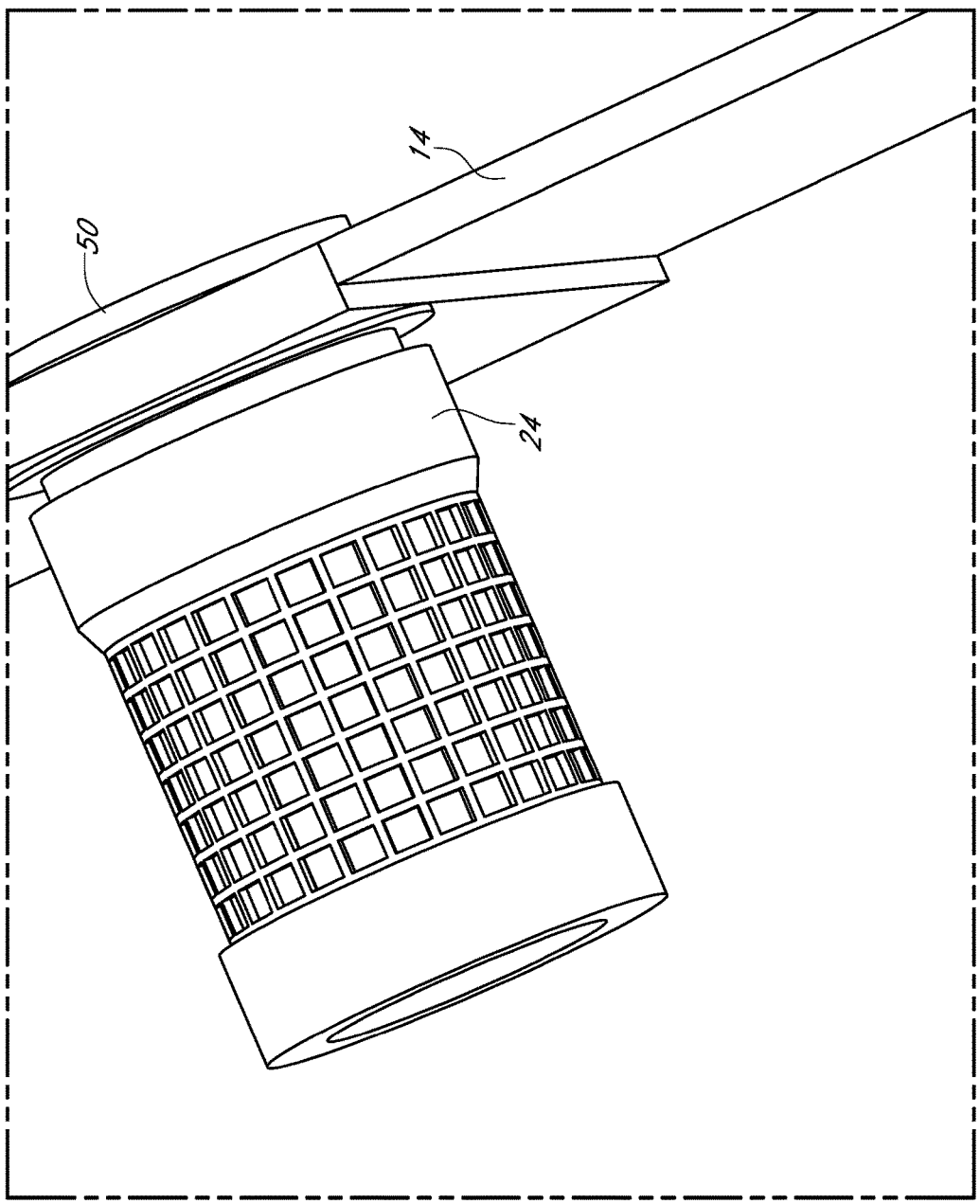
FIGS. 4A & B are perspective views of an illustrative embodiment of the feeder with the various components assembled and the feeder mounted to a wall via engagement with the connector and suction cup.
Figure 4B:
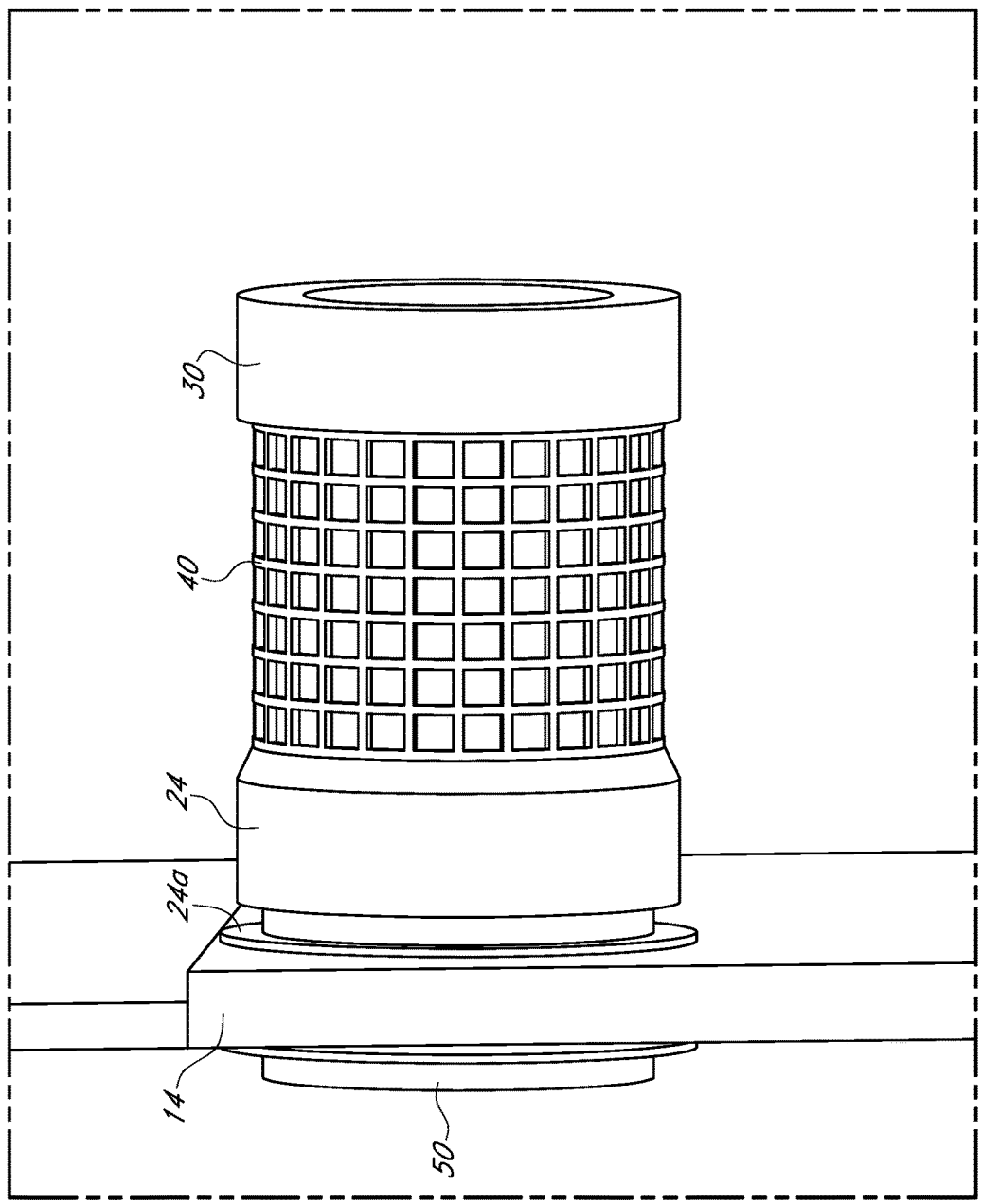

Referring now to FIGS. 4A & 4B, which depict an illustrative embodiment of a feeder 10 engaged with a wall 14 of an aquarium, the base 24 may be formed with a suction cup 24a. The base 24 may be configured to cooperate with a connector 50, such that in the proper orientation the base 24 and the connector 50 are magnetically attracted to one another. It is contemplated that during use, the body 20, lid 30, and cover 40 of the feeder 10 may be positioned on an interior portion of the wall 14 and associated aquarium, and that the connector 50 may be positioned on an exterior portion of the wall 14 and associated aquarium. The magnetic attraction between the base 24 and connector 50 may be configured such that it is sufficient to secure the relative position of both the base 24 and connector 50 with respect to the wall 14, but such that a user may reposition either the base 24 (and consequently the body 20, lid 30, and/or cover 40) and/or connector 50 with respect to one another without undue effort. Additionally or alternatively, a suction cup 24a may be formed in or engaged with the base 24 of the body 20 so as to provide the selective engagement mechanism between the feeder 10 and a wall 14 of an aquarium. That is, a suction cup 24a may be used in lieu of or in addition to a magnet and connector 50 and vice versa. Accordingly, any suitable structure and/or method may be used to selectively engage the feeder 10 with a wall 14 of an aquarium without limitation unless otherwise indicated in the following claims.

As previously discussed above, various dimensions for certain components of an illustrative embodiment of a feeder 10 are shown in FIGS. 5 & 6. Illustrative dimensions for a body 20, gap 22, base 24, suction cup 24a, base ledge 24b, and portions of a lid 30 are shown in FIG. 5. Illustrative dimensions for additional portions for a lid 30 and cover 40 are shown in FIG. 6. In the illustrative embodiment shown in FIGS. 1-6, the lid 30 may generally be configured as a cylinder having a first end that is open (the end that is positioned adjacent the cover 40 after assembly) and a second end that is formed with an aperture in the axial face of the lid 30, wherein the aperture may serve as a drain in certain instances. Again, such dimensions are not meant to be limiting to the scope of the feeder 10 or method of using same but are merely for illustrative purposes unless otherwise indicated in the following claims.

Referring now to FIGS. 7-11, a second illustrative embodiment of a feeder 10 is shown therein. Generally, this embodiment may be configured in a manner similar to the embodiment previously described herein and shown in FIGS. 1-6 and provide the same and/or similar advantages as provided thereby. However, the second illustrative embodiment of a feeder 10 may have different dimensions than those of the embodiment shown in FIGS. 1-6 as discussed in further detail below. Additionally, a second illustrative embodiment of a lid 30 is shown in FIGS. 7-11 wherein the lid 30 may be formed substantially as a cylinder having an inner diameter slightly larger than the outer diameter of the body 20 and/or cover 40.

Generally, the body 20 of the second illustrative embodiment of a feeder 10 may be shorter along its longitudinal length than that of the first illustrative embodiment of a feeder 10. This difference is shown at least in a contrast between FIG. 5, which provides illustrative dimensions of certain portions of the first illustrative embodiment of a feeder 10, and FIGS. 10 & 12, which provide illustrative dimensions of certain portions of the second illustrative embodiment of a feeder 10. The length of both the lid 30 and base 24 along the longitudinal axes (i.e., axial length) thereof may be less in the second illustrative embodiment of a feeder 10 compared to the corresponding lengths thereof in the first illustrative embodiment of a feeder 10.

Figure 10:
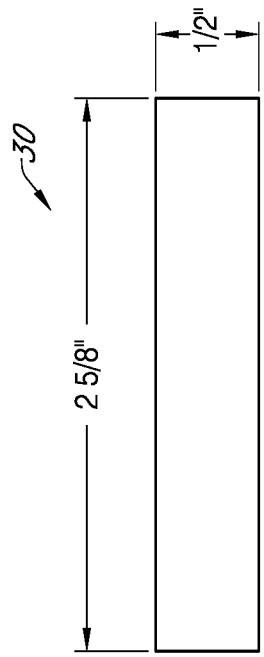
FIG. 10 is a detailed drawing showing various illustrative dimensions for the illustrative embodiment of a lid used in the illustrative embodiment of a feeder shown in FIGS. 7-9B.
Figure 10:
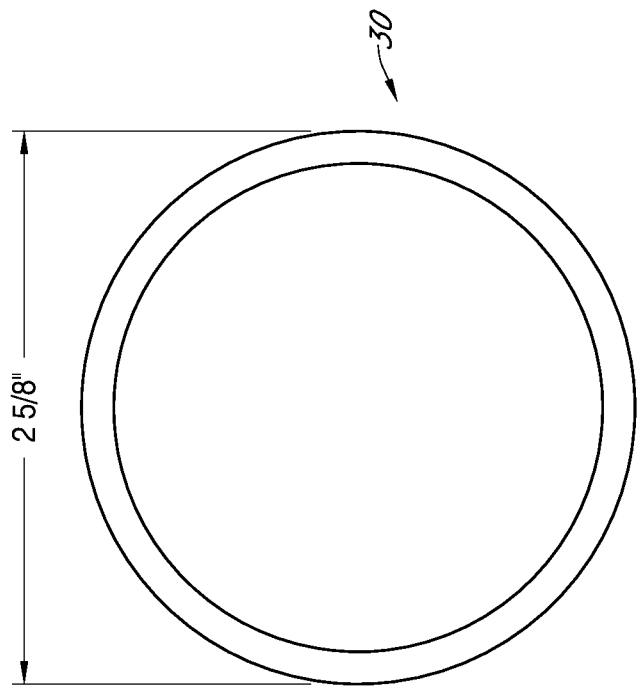
Figure 11:
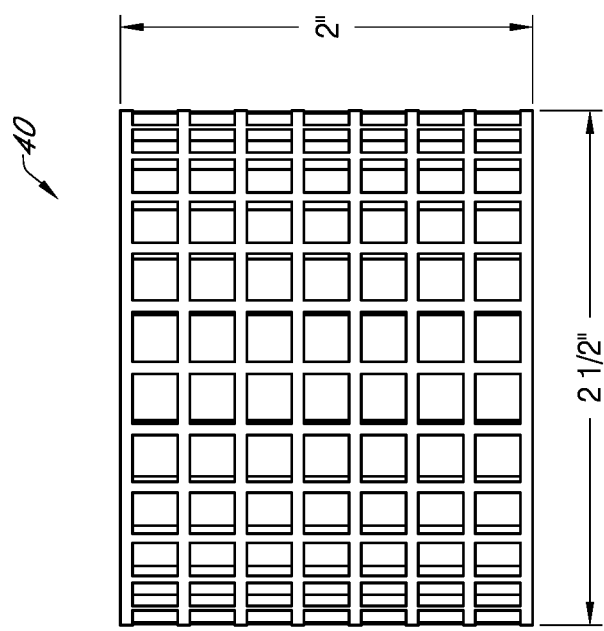
FIG. 11 is another detailed drawing showing various illustrative dimensions for the illustrative embodiment of a cover used with the illustrative embodiment of a feeder shown in FIGS. 7-10.
Figure 12:
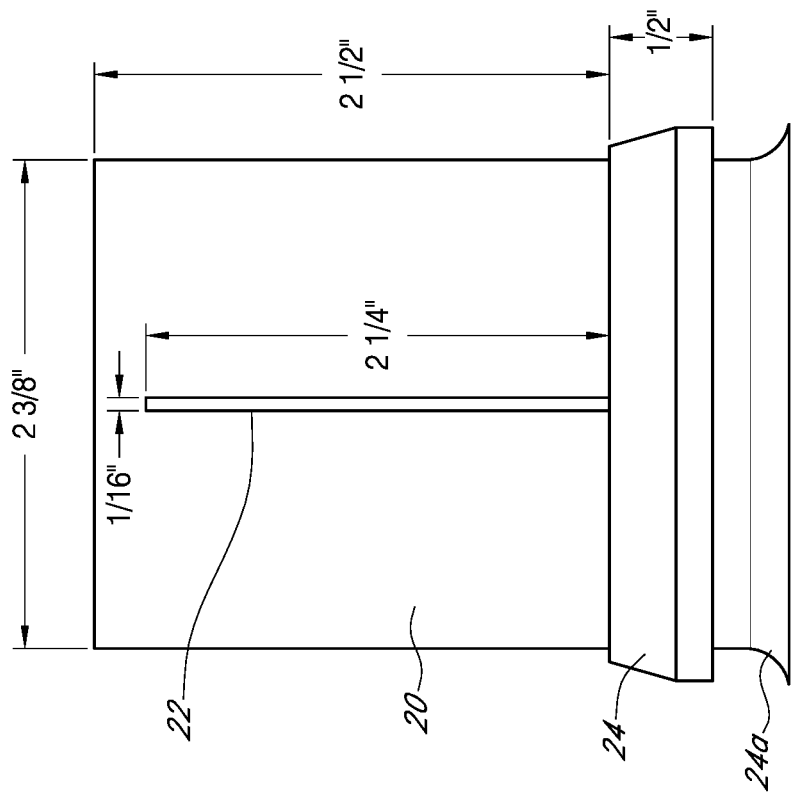
FIG. 12 is another detailed drawing showing various illustrative dimensions for various components of the illustrative embodiment of a feeder shown in FIGS. 7-11.

As shown in FIGS. 10-12, the axial length of the body 20 may be greater than that of the cover 40, and the difference therebetween may be approximately equal to the axial length of the lid 30. Additionally, the length of the gap 22 may be approximately equal to (or slightly greater than) the axial length of the cover 40 depending on the specific embodiment of the feeder 10. However, as previously discussed, any dimensions included herewith are for illustrative purposes only and in no way limit the scope of the feeder 10 unless otherwise indicated in the following claims, and the optimal dimensions, shape, configuration, etc. of the various components of the feeder 10 may vary from one application thereof to the next.

Illustrative Method of Use

In one illustrative method of use, the feeder 10 may be used to secure the position of a food sheet 16 positioned between the exterior surface of the body 20 and the interior surface of the cover 40. A food sheet 16 may first be provided having the desired dimensions, which may require folding, cutting, and/or otherwise manipulating the shape and/or dimensions of a commercially available food sheet 16.

A first edge of the food sheet 16 may be inserted into the gap 22 formed in the body 20 and the food sheet 16 may be wrapped around the body 20 such that the food sheet 16 is generally the same shape as the exterior surface of the body 20 (i.e., cylindrical for the illustrative embodiments of a feeder 10 pictured herein). Generally, the width of the gap 22 may be configured such that the edge of a food sheet 16 may be inserted into the gap 22 without difficulty, but simultaneously prevent and/or mitigate undesired movement of the food sheet 16 with respect to the body 20 without limitation unless otherwise indicated in the following claims. In one illustrative embodiment, the gap 22 may be approximately 1/16 inches wide and 2.25 inches long, but the scope of the present disclosure is not so limited unless otherwise indicated in the following claims.

Next, the cover 40 may be positioned over a portion of the food sheet 16 and body 20 until a first edge of the cover 40 is positioned adjacent the base 24 to abut base ledge 24b. At this point, the lid 30 may be engaged with the end of the body 20 opposite the base 24 such that the lid 30 may be positioned adjacent a second edge of the cover 40. The lid 30 and body 20 may be configured such that the lid 30 may be selectively secured to the body 20 via an interference fit, but any suitable methods and/or structures for selectively securing the lid 30 to the body 20 may be used without limitation unless otherwise indicated in the following claims. In an illustrative embodiment of the feeder 10, the lid 30 may secure the axial position of the cover 40 with respect to the body 20.

Finally, the body 20, lid 30, and cover 40 (having the food sheet 16 positioned between the body 20 and cover 40) may be positioned on an interior surface of a wall 14 of an aquarium. The base 24 may abut the interior surface of the wall 14, and depending on the specific embodiment of the feeder 10, the suction cup 24a may engage the wall 14 and secure the position of the feeder 10 with respect to the wall 14, and/or a connector 50 may be positioned adjacent the base 24 on an exterior surface of the wall 14 to secure the position of the feeder 10 with respect to the wall 14. The suction cup 24a and magnetic attraction between the base 24 and connector 50 may be used simultaneously with one another or independently in various embodiments of the feeder 10 to ensure proper engagement between the feeder 10 and wall 14 without limitation unless otherwise indicated in the following claims.

The various relative dimensions of the components of the feeder 10 may be infinitely varied depending on the specific application of same. Several illustrative aspects of a feeder 10 according to the present disclosure and relative dimensions of the components of the feeder 10 are shown in the corresponding figures. However, these aspects and dimensions are not meant to be limiting in any sense, but rather are provided to show how the various dimensions of the feeder 10 may be manipulated without departing from the spirit and scope of the present disclosure unless so indicated in the following claims.

Although various benefits/features of the illustrative embodiments of the feeder 10 have been described herein in accordance with a food sheet 16 configured as nori, the scope of the present disclosure is not so limited and extends to any food sheet and/or other suitable application without limitation unless otherwise limited in the following claims.

Although the descriptions of the illustrative aspects of the present disclosure have been quite specific, it is contemplated that various modifications could be made without deviating from the spirit and scope of the present disclosure. Accordingly, the scope of the present disclosure is not limited by the description of the illustrative aspects and/or corresponding figures unless so indicated in the following claims.

The number, configuration, dimensions, geometries, and/or relative locations of the various elements of the feeder 10, will vary from one aspect of the present disclosure to the next, as will the optimal configuration thereof. Accordingly, the present disclosure is in no way limited by the specific configurations, dimensions, and/or other constraints of those elements unless so indicated in the following claims.

In the foregoing detailed description, various features are grouped together in a single embodiment for purposes of streamlining the disclosure. This method of disclosure is not to be interpreted as reflecting an intention that the present disclosure requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate embodiment.

The materials used to construct the feeder 10 and various elements and/or components thereof will vary depending on the specific application thereof, but it is contemplated that polymers, plastics, elastomeric materials, metals, metal alloys, natural materials, stone, cement, ceramics, fibrous materials, and/or combinations thereof may be especially useful for the feeder 10 in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described the preferred embodiments of the various methods and apparatuses, other features of the present disclosure will undoubtedly occur to those versed in the art, as will numerous modifications and alterations in the various aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the feeder 10 and/or components thereof are not limited to the specific embodiments pictured and described herein, but are intended to apply to all similar apparatuses and methods for providing the functionality, features, and/or advantages of a feeder 10 without limitation unless otherwise indicated in the following claims. Modifications and alterations from the described embodiments will occur to those skilled in the art without departure from the spirit and scope of the present disclosure.

Any of the various features, functionalities, aspects, configurations, etc. for a feeder 10 and/or components of any of the foregoing may be used alone or in combination with one another (depending on the compatibility of the features) from one embodiment and/or aspect of the feeder 10 to the next. Accordingly, a nearly infinite number of variations of the feeder 10 exists. All of these different combinations constitute various alternative aspects of the feeder 10. The embodiments described herein explain the best modes known for practicing the feeder 10 and will enable others skilled in the art to utilize the same. The claims are to be construed to include alternative embodiments to the extent permitted by the prior art. Modifications and/or substitutions of one feature for another in no way limit the scope of feeder 10 and/or component thereof unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the feeder 10 and/or components thereof and/or methods of using same have been described in connection with preferred aspects and specific examples, it is not intended that the scope be limited to the particular embodiments and/or aspects set forth, as the embodiments and/or aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It should be noted that the present disclosure is not limited to the specific embodiments pictured and described herein, but are intended to apply to all similar apparatuses and methods to secure the position of, restrain, and/or properly orient a food sheet 16 or portions thereof with respect to a wall 14, and/or otherwise providing any of the features and/or advantages of any aspect of the present disclosure.

Modifications and alterations from the described embodiments will occur to those skilled in the art without departure from the spirit and scope of the present disclosure.

What is claimed is:

1. A feeder comprising:
   a. a body having a generally cylindrical shape, wherein said body is formed with a base on a first end thereof forming a base ledge, and wherein a single gap extends along a length of said body from said base to a second end of said body, wherein an end of the single gap terminates at an edge of the base ledge;
   b. a generally cylindrical cover, wherein an inner diameter of said cover is slightly larger than an outer diameter of said body, and wherein a length of said cover is approximately equal to a length of said single gap formed in said body, wherein said cover is configured to be positioned onto said body and against said base ledge; and,
   c. a connector engaged with said base of said body, wherein said connector is configured to selectively engage said feeder to a wall of an aquarium.

2. The feeder according to claim 1 wherein said connector further comprises a suction cup.

3. The feeder according to claim 1 wherein said base further comprises a first magnet, wherein said connector further comprises a second magnet that is selectively removeable from said base, and wherein said first magnet and said second magnet are attracted to one another.

4. The feeder according to claim 3 wherein said connector further comprises a suction cup.

5. The feeder according to claim 1 wherein said gap is further defined such that said length of said gap is less than said axial length of said body.

6. The feeder according to claim 5 wherein said axial length of said cover is less than said length of said body.

7. The feeder according to claim 1 wherein a generally cylindrical lid may be positioned on the body, wherein an inner diameter of said lid is slightly larger than an outer diameter of said body, and wherein a length of said lid is less than a length of said gap.

8. The feeder according to claim 7 wherein said lid is further defined as comprising an end surface on an axial face thereof, wherein said end surface is formed with an aperture at the center thereof.

9. The feeder according to claim 7 wherein said axial length of said cover is less than said length of said body.

10. The feeder according to claim 7 wherein an axial length of said lid is approximately equal to a difference in axial length between said axial length of said body and said axial length of said cover.

11. The feeder according to claim 7 wherein said connector further comprises a suction cup.

12. A feeder comprising:
   a. a body having a generally cylindrical shape, wherein said body is formed with a base on a first end thereof forming a base ledge, and wherein a gap extends along a length of said body from said base to a second end of said body, said gap suitable for insertion of an end of a food sheet, wherein an end of the gap terminates at an edge of the base ledge;
   b. a generally cylindrical cover, wherein an inner diameter of said cover is slightly larger than an outer diameter of said body, and wherein a length of said cover is approximately equal to a length of said gap formed in said body, said body and said cover are configured to position said food sheet between said body and said cover and against said base ledge; and,
   c. a connector engaged with said base of said body, wherein said connector is configured to selectively engage said feeder to a wall of an aquarium.

13. The feeder according to claim 12 wherein said connector further comprises a suction cup.

14. The feeder according to claim 12 wherein said base further comprises a first magnet, wherein said connector further comprises a second magnet that is selectively removeable from said base, and wherein said first magnet and said second magnet are attracted to one another.

15. The feeder according to claim 12 wherein said gap is further defined such that said length of said gap is less than said axial length of said body.

16. The feeder according to claim 15 wherein said axial length of said cover is less than said length of said body.

17. The feeder according to claim 12 wherein a generally cylindrical lid may be positioned on the body, wherein an inner diameter of said lid is slightly larger than an outer diameter of said body, and wherein a length of said lid is less than a length of said gap.

18. The feeder according to claim 17 wherein said lid is further defined as comprising an end surface on an axial face thereof, wherein said end surface is formed with an aperture at the center thereof.

19. The feeder according to claim 17 wherein said axial length of said cover is less than said length of said body.

20. The feeder according to claim 17 wherein an axial length of said lid is approximately equal to a difference in axial length between said axial length of said body and said axial length of said cover.

21. The feeder according to claim 17 wherein said connector further comprises a suction cup.

* * * * *